(No Model.)
D. BUCKLER & E. N. PELZER.
SPRING WAGON.
No. 304,292. Patented Sept. 2, 1884.
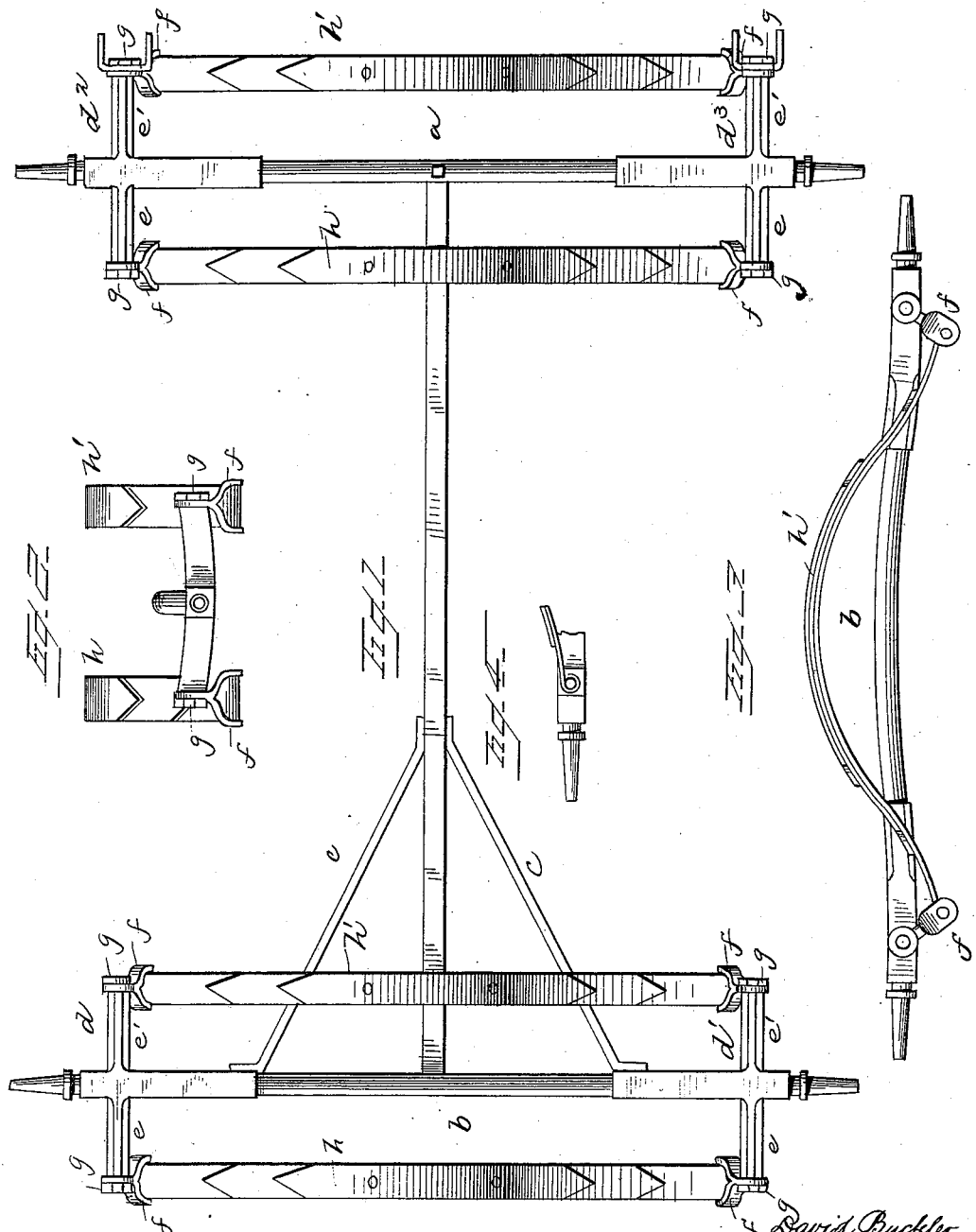
WITNESSES
F. L. Ourand
E. G. Siggers
David Buckler
Edward N. Pelzer
INVENTORS
by C. A. Snow & Co.
Attorneys

UNITED STATES PATENT OFFICE.

DAVID BUCKLER AND EDWARD NICHOLAS PELZER, OF IONIA, MICHIGAN.

SPRING-WAGON.

SPECIFICATION forming part of Letters Patent No. 304,292, dated September 2, 1884.

Application filed March 1, 1884. (No model.)

*To all whom it may concern:*

Be it known that we, DAVID BUCKLER, a subject of the Queen of Great Britain, and EDWARD N. PELZER, a citizen of the United States, both residing at Ionia, in the county of Ionia and State of Michigan, have invented a new and useful Platform Spring-Wagon, of which the following is a specification, reference being had to the accompanying drawings.

This invention has relation to running-gear for a platform spring-wagon; and it consists in the construction and novel arrangement of parts, as will be hereinafter fully described, and particularly pointed out in the claim appended.

Figure 1 is a plan view of the running-gear of a spring platform-vehicle having our improvements applied. Fig. 2 is a side elevation; and Fig. 3 is an end elevation, the wheels being omitted in the several views. Fig. 4 is a view of a modification.

In this class of vehicles as heretofore constructed the springs have been hung upon shackles working directly upon the axles, or upon truss attachments clipped upon the axle, and they in practical use soon become loose, and are therefore objectionable. To overcome these objections we have provided the axles near each end with solid cross-arms, which are forged integral with the axles, and from the ends of these integral cross-arms we suspend the links to which the ends of the semi-elliptic cross-springs are hinged; or the links may be omitted, and the springs hinged directly upon the ends of cross-arms. The cross-arms of the front axle are provided with shackles for connecting the thills or pole to the vehicle. With this exception the front and rear cross-arms are similar in construction.

Referring by letter to the accompanying drawings, $a$ designates the front axle, $b$, the rear axle, and $c\ c$ the reaches, which may, however, be of any construction desired. The cross-arm supports $d\ d'\ d^2\ d^3$ are four in number, each comprising two arms, $e\ e'$, projecting in opposite directions from the body of the axle and forged integral therewith. Their ends are rounded to receive the eyes of the links $f\ f$, and nuts $g\ g$ are turned upon them and upset to prevent the links from coming off, while at the same time they are given sufficient play to permit them to oscillate on the cross-arm supports. The ends of the semi-elliptic springs $h\ h'$ are hinged to the lower portions of these links, or directly to the ends of cross-arms, and the platform-body secured upon the springs in any of the well-known ways.

This arrangement is cheap, simple, and complete, and is especially adapted for use on light vehicles.

We are aware that an axle provided with integral lugs has been combined with the shafts of the vehicle in such a manner that the bolts and nuts in said construction can be adjusted to produce a variation of several inches in the height of the shafts at the harness-lugs. We therefore disclaim said construction.

Having thus fully described our invention, what we claim as new, and desire to secure by Letters Patent, is—

In a vehicle, the combination, with an axle having solid integral cross-arm supports near the axle-journals, of the semi-elliptic springs connected directly to the ends of the cross-arm supports, substantially as specified.

In testimony that we claim the foregoing as our own we have hereunto affixed our signatures in presence of two witnesses.

DAVID BUCKLER.
EDWARD NICHOLAS PELZER.

Witnesses:
HENRY P. TAYLOR,
C. A. PRESTON.